(12) United States Patent
Noguchi et al.

(10) Patent No.: US 6,552,156 B2
(45) Date of Patent: *Apr. 22, 2003

(54) WATER-SOLUBLE ADDITION POLYMER AND AQUEOUS INK USING THE SAME (75) Inventors: Hiromichi Noguchi, Hachiohji; Masahiro Haruta, Tokyo; Shoji Koike, Yokohama; Koromo Shirota, Kawasaki; Tomoya Yamamoto, Nara; Mariko Suzuki, Yokohama; Shinichi Hakamada, Kawasaki, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/727,689

(22) Filed: Dec. 4, 2000

(65) Prior Publication Data

US 2001/0001103 A1 May 10, 2001

Related U.S. Application Data (62) Division of application No. 08/948,252, filed on Oct. 9, 1997, now Pat. No. 6,214,963.

(30) Foreign Application Priority Data

Oct. 11, 1996 (JP) .............................. 8-287293

(51) Int. Cl.$^7$ .............................................. C08G 18/65
(52) U.S. Cl. ......................................... 528/71; 524/589
(58) Field of Search ............................ 528/71; 524/589

(56) References Cited

U.S. PATENT DOCUMENTS

| 3,431,223 A | 3/1969 | Reymore et al. | ............ 260/2.5 |
| 4,403,091 A | 9/1983 | Hartman et al. | ............ 528/288 |
| 4,693,846 A | 9/1987 | Piccirilli et al. | ............ 260/97 |
| 5,118,351 A | 6/1992 | Shirota et al. | ................. 106/22 |
| 5,696,182 A | 12/1997 | Kashiwazaki et al. | ...... 523/161 |
| 6,214,963 B1 * | 4/2001 | Noguchi et al. | |

FOREIGN PATENT DOCUMENTS

| JP | 48-14888 | 2/1973 |
| JP | 50-100386 | 8/1975 |
| JP | 54-2484 | 1/1979 |
| JP | 55-54353 | 4/1980 |
| JP | 63-37160 | 2/1988 |
| JP | 63-37809 B2 | 7/1988 |
| JP | 7-196748 | 8/1995 |
| JP | 7-268055 | 10/1995 |
| JP | 8-27242 | 1/1996 |

* cited by examiner

Primary Examiner—Rachel Gorr
(74) Attorney, Agent, or Firm—Fitzpatrick, Cella, Harper & Scinto (57) ABSTRACT The present invention relates to a water-soluble addition polymer which is produced from a carboxylated diol represented by the following general formula (I) and a polyisocyanate and has an acid value of 100 to 250, and an aqueous ink using this polymer as a dispersant for a disperse dye:

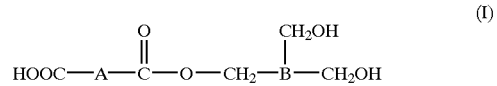

(I)

wherein the residue A is an aromatic, alicyclic or aliphatic polybasic acid residue, and the residue B is a trivalent aliphatic alcohol residue.

10 Claims, 3 Drawing Sheets

WATER-SOLUBLE ADDITION POLYMER AND AQUEOUS INK USING THE SAME

This is a divisional application of application Ser. No. 08/948,252, filed Oct. 9, 1997, now U.S. Pat. No. 6,214,963.

BACKGROUND OF THE INVENTION

1. Field of the Invention

The present invention relates to a water-soluble addition polymer and particularly a water-soluble urethane polymer, and an aqueous ink using this polymer as a dispersant for a disperse dye.

The present invention also relates to an ink jet recording process and an ink jet textile printing process using this aqueous ink.

2. Related Background Art

Processes for producing aqueous polyurethanes and applications of these polymers in ink have been known. For example, (1) Japanese Patent Publication No. 63-14723 discloses an aqueous dispersion of a urethane-modified vinyl polymer and a method for making the same, (2) Japanese Patent Laid-Open No. 7-268055 discloses an aqueous polyurethane polyurea dispersion, (3) Japanese Patent Laid-Open No. 8-27242 discloses an aqueous polyurethane resin and (4) Japanese Patent Laid-Open No. 63-37160 discloses a method for producing a pigment ink using an aqueous polyurethane dispersion.

In these prior art technologies, polyurethanes are used as a dispersant for pigment in the form of an aqueous dispersion in which polyurethane particles are suspended in water, not in the form of an aqueous solution.

On the other hand, non-plate printing using ink jet recording processes has been proposed. As basic requirements in these ink jet recording processes, the dispersion must consist of fine particles having an average size of not greater than 250 nm, have a low viscosity of not greater than 3 mPa·S when containing solid components of approximately 10%, and be stable.

Technologies for dispersing disperse dyes into aqueous media have been known. Typical examples of aqueous dispersants for disperse dyes include naphthalenesulfonic acid-formaldehyde condensation products and lignin sulfonate. Also, surfactants as dispersants are disclosed by, for example, Hoechst AG in Japanese Patent Laid-Open No. 48-14888, Nikka Chemical Co., Ltd. in Japanese Patent Laid-Open No. 50-100386, Toho Chemical Industry Co., Ltd. in Japanese Patent Laid-Open No. 54-2484 and ICI Inc. in Japanese Patent Laid-Open No. 55-54353. These materials are used for dispersion in conventional dyeing processes. Fine particle dispersions having an average size of not greater than 250 nm cannot, however, be produced from these materials with great efficiency and stability.

Technologies for dispersing pigment in aqueous media have been used practically in writing inks, ink jet recording inks, liquid developers for photoresists and electrophotographs. Even if these technologies are applied to dispersion of disperse dyes, the dyes are barely dispersed into fine particles of submicron regions.

Significantly stable dispersions nowadays are produced by aqueous pigment dispersing processes with aqueous dispersants. Images formed by printing or coating with inks or paints including these dispersants have high water-proof characteristics and high abrasion resistance, probably due to tight adsorption, as a protective colloid, of the dispersants onto the pigment particles. The adsorbed materials cannot therefore be readily desorbed from the particles by chemical or physical treatment. This phenomenon is a hindrance in the removal of dispersants after dyeing processes. Further, it is important that the fine particle dispersions be stable in cloth-dyeing processes. Production of stable dispersions with high yield from the above-mentioned conventional materials, however, is extremely difficult.

SUMMARY OF THE INVENTION

An object of the present invention is to provide an aqueous dispersant which imparts stable dispersibility to a disperse dye with great efficiency and, in particular, a water-soluble addition polymer used as an aqueous dispersant for a disperse dye.

Another object of the present invention is to provide an aqueous ink capable of ink jet recording of deep high-density color images without bleeding on textile products, such as cloth, and which is suitable for dyeing the textile products.

The present invention includes a water-soluble addition polymer produced from a carboxylated diol represented by the following general formula (I) and a polyisocyanate and having an acid value of 100 to 250, and an aqueous ink using this polymer as a dispersant for a disperse dye:

(I)

wherein the residue A is an aromatic, alicyclic or aliphatic polybasic acid residue, and the residue B is a trivalent aliphatic alcohol residue.

The present invention also includes an ink jet recording process and an ink jet textile printing process using this aqueous ink.

Further objects, features and advantages of the present invention will become apparent from the following description of the preferred embodiments with reference to the attached drawings.

DETAILED DESCRIPTION OF THE PREFERRED EMBODIMENTS

The present invention will now be described in detail with reference to the preferred embodiments.

First, the materials used in the present invention will be described.

(Water-Soluble Urethane Polymer)

The water-soluble urethane polymer in accordance with the present invention is a water-soluble addition polymer made from a diisocyanate and a carboxylated diol. Their basic structures are as follows:

diisocyanate: $OCN-R_2-NCO$ carboxylated diol:

basic structure of water-soluble urethane polymer:

wherein $R_1$ represents an ester residue from a carboxylic acid and a multivalent alcohol, $R_2$ represents a residue of the diisocyanate compound, and n represents an integer in a range from 1 to 100.

The water-soluble urethane polymer in accordance with the present invention has an acid value of 100 to 250. An acid value of less than 100 decreases reduction washability in the dyeing process using an aqueous fine-particle dispersion ink containing a disperse dye in accordance with the present invention and thus decreases the aesthetic property of the dyed product. On the other hand, an acid value of greater than 250 increases the particle size and decreases dispersion efficiency and stability of the aqueous fine-particle dispersion ink. Further, it is preferred in the present invention that a water-soluble urethane polymer having a number average molecular weight of 2,500 to 30,000 be used.

Raw materials used for production of the water-soluble urethane polymer having the above-mentioned general formula will now be described. The carboxylated diol in accordance with the present invention has two hydroxyl groups and one carboxyl group. For example, compounds represented by the following general formula have been conventionally used for producing water-soluble polyurethanes:

wherein R is an alkyl group having 1 to 3 carbon atoms. Examples of the compounds include 2,2-dimethylolpropionic acid, 2,2-dimethylolbutyric acid and 2,2-dimethylolvaleric acid. It is, however, difficult to describe that these aliphatic carboxylated diols serve the purpose of the present invention. That is, these carboxylated diols do not satisfy dispersibility, preservability, or coloring characteristics.

It is preferred that a carboxylated diol represented by the following general formula (I) be used in the present invention:

wherein the residue A is an aromatic, alicyclic or aliphatic polybasic acid residue, and the residue B is a trivalent aliphatic alcohol residue. Such a carboxylate diol is a so-called mono-ester compound prepared by condensation of a trivalent aliphatic alcohol with a polybasic acid or anhydride.

The polybasic acids used in synthesis of the mono-ester compound in accordance with the present invention include aromatic polybasic acids, alicyclic polybasic acids and aliphatic polybasic acids. Preferred aromatic polybasic acids and alicyclic polybasic acids have the following general formulae (1) to (6):

wherein R in the general formula (1) is a hydrogen atom, or a carboxyl or alkyl group.

Examples of aromatic polybasic acids and alicyclic polybasic acids include phthalic acid, trimellitic acid, Endic acid: 3,6-endomethylene-$\Delta^4$-tetrahydrophthalic acid, tetrahydrophthalic acid, hexahydrophthalic acid, cyclopentane-1,3-dicarboxylic acid and cyclohexane-1,4-dicarboxylic acid. Anhydrides of these dicarboxylic acids are also usable in the present invention.

Examples of preferred aliphatic polybasic acids include dicarboxylic acids, e.g. adipic acid, succinic acid, malonic acid, sebacic acid and fumaric acid. In the present invention, aromatic polybasic acids and alicyclic polybasic acids are preferred to aliphatic polybasic acids, because the resulting dispersion is stable against hydrolysis, and has excellent dispersibility and coloring characteristics.

Examples of trivalent aliphatic alcohols which react with the polybasic acids include trimethylolpropane, trimethylolethane, trimethylolmethane, 2-hydroxymethyl-1,6-hexanediol, 2-hydroxymethyl-1,4-butanediol and 2-hydroxymethyl-1,5-pentanediol.

The carboxylated diol represented by the general formula (I) is essential to achieve a high acid value ranging from 100 to 250 in the water-soluble urethane polymer in accordance with the present invention. The formulation of the above-mentioned raw materials and the production conditions must therefore be optimized so that the resulting water-soluble urethane polymer has an acid value of 100 to 250.

Another process for preparing the carboxylated diol represented by the general formula (I) is introduction of a pendant carboxyl group, that is, partial carboxylation of a multivalent alcohol with monochloroacetic acid. It is, however, difficult to form a pure objective product using this process.

Examples of solvents preferably used in the reaction for preparing the carboxylated diol represented by the general formula (I) include ethers, e.g. tetrahydrofuran and dioxane; esters, e.g. ethyl acetate; ketones, e.g. acetone and methyl ethyl ketone; dialkyl ethers of glycols; diesters; amides, e.g. N-methylpyrrolidone and dimethylformamide; and halogenated aromatic compounds. Among these, solvents with low boiling points are preferred because these solvents can be readily removed under reduced pressure after the reaction.

Examples of diisocyanates to be reacted with the above-mentioned carboxylated diols in preparation of the water-soluble urethane polymers in accordance with the present invention include 2,4-tolylene diisocyanate, 2,6-tolylene diisocyanate, hexamethylene diisocyanate, m-phenylene diisocyanate, p-phenylene diisocyanate, 4,4'-diphenylmethane diisocyanate, tetramethylene diisocyanate, isophorone diisocyanate, xylylene diisocyanate, bis(isocyanatomethyl)cyclohexane, dicyclohexylmethane diisocyanate, lysine diisocyanate, trimethylhexamethylene diisocyanate, 3,3'-dichloro-4,4'-biphenylene diisocyanate, 1,5-naphthalene diisocyanate and 1,5-tetrahydronaphthalene diisocyanate.

In order to form some branches in the water-soluble urethane polymer, a small amount of compound with three or more isocyanate groups may be added. Examples of such compounds include adducts, urethanes, allophanates, biurets and isocyanurates from tolylene diisocyanate and hexamethylene diisocyanate.

The following Compounds (12) to (18) are preferred examples of the carboxylated diols represented by the general formula (I) in accordance with the present invention:

Compound (12):

Compound (13):

Compound (14):

Compound (15):

Compound (16):

Compound (17):

Compound (18):

A method for preparing a water-soluble urethane polymer in accordance with the present invention using a carboxylated diol represented by the general formula (I) will now be described. A carboxylated diol represented by the general formula (I) is dissolved into a solvent mixture of methyl ethyl ketone and N-methylpyrrolidone to prepare a 5 to 50 wt % diol solution. A diisocyanate solution containing one of the above-mentioned diisocyanates is added dropwise with stirring into the diol solution maintained at 0 to 60° C. in a nitrogen-substituted reaction vessel, and is allowed to react for 1 to 5 hours. After the diisocyanate is completely exhausted, the solution is neutralized with a neutralizer, such as aqueous ammonia, a sodium hydroxide solution or monoethanolamine, and the solvent is removed under a reduced pressure while water is added to obtain a water-soluble urethane polymer in accordance with the present invention.

Inorganic and organic neutralizers can be used for neutralizing the aqueous carboxylated urethane polymer. The neutralizers that can be used are the same compounds as the pH adjustors described below.

The water-soluble addition polymer, i.e., water-soluble urethane polymer, in accordance with the present invention may contain a compound selected-from the group consisting of diols not having a carboxyl group, e.g. ethylene glycol, propylene glycol, diethylene glycol, triethylene glycol, polyethylene glycol, dipropylene glycol and tripropylene glycol; and caprolactone and oligomers thereof, in the production process. These compounds are used for adjusting hydrophilic or hydrophobic characteristics, flexibility, the softening point or the acid value of the polymer.

(Disperse Dye)

Usable disperse dyes dispersed by the water-soluble urethane polymer in an aqueous dispersion ink are as follows:

Yellow Disperse Dye

C. I. Disperse Yellow 5, C. I. Disperse Yellow 42, C. I. Disperse Yellow 54, C. I. Disperse Yellow 64, C. I. Disperse Yellow 79, C. I. Disperse Yellow 82, C. I. Disperse Yellow 83, C. I. Disperse Yellow 93, C. I. Disperse Yellow 99, C. I. Disperse Yellow 100, C. I. Disperse Yellow 119, C. I. Disperse Yellow 122, C. I. Disperse Yellow 124, C. I. Disperse Yellow 126, C. I. Disperse Yellow 160, C. I. Disperse Yellow 184, C. I. Disperse Yellow 186, C. I. Disperse Yellow 198, C. I. Disperse Yellow 199, C. I. Disperse Yellow 204, C. I. Disperse Yellow 224 and C. I. Disperse Yellow 237.

Oranae Disperse Dye

C. I. Disperse Orange 13, C. I. Disperse Orange 29, C. I. Disperse Orange 31, C. I. Disperse Orange 33, C. I. Disperse Orange 49, C. I. Disperse Orange 54, C. I. Disperse Orange 55, C. I. Disperse Orange 66, C. I. Disperse Orange 73, C. I. Disperse Orange 118, C. I. Disperse Orange 119 and C. I. Disperse Orange 163.

Red Disperse Dye

C. I. Disperse Red 54, C. I. Disperse Red 72, C. I. Disperse Red 73, C. I. Disperse Red 86, C. I. Disperse Red 88, C. I. Disperse Red 91, C. I. Disperse Red 92, C. I. Disperse Red 93, C. I. Disperse Red 111, C. I. Disperse Red 126, C. I. Disperse Red 5 127, C. I. Disperse Red 134, C. I. Disperse Red 135, C. I. Disperse Red 143, C. I. Disperse Red 145, C. I. Disperse Red 152, C. I. Disperse Red 153, C. I. Disperse Red 154, C. I. Disperse Red 159, C. I. Disperse Red 164, C. I. Disperse Red 167, C. I. Disperse Red 177, C. I. Disperse Red 181, C. I. Disperse Red 204, C. I. Disperse Red 206, C. I. Disperse Red 207, C. I. Disperse Red 221, C. I. Disperse Red 239, C. I. Disperse Red 240, C. I. Disperse Red 258, C. I. Disperse Red 277, C. I. Disperse Red 278, C. I. Disperse Red 283, C. I. Disperse Red 311, C. I. Disperse Red 323, C. I. Disperse Red 343, C. I. Disperse Red 348, C. I. Disperse Red 356 and C. I. Disperse Red 362.

Violet Disierse Dye

C. I. Disperse Violet 33.

Blue Dis-erse Dye

C. I. Disperse Blue 56, C. I. Disperse Blue 60, C. I. Disperse Blue 73, C. I. Disperse Blue 87, C. I. Disperse Blue 113, C. I. Disperse Blue 128, C. I. Disperse Blue 143, C. I. Disperse Blue 148, C. I. Disperse Blue 154, C. I. Disperse Blue 158, C. I. Disperse Blue 165, C. I. Disperse Blue 165:1, C. I. Disperse Blue 165:2, C. I. Disperse Blue 176, C. I. Disperse Blue 183, C. I. Disperse Blue 185, C. I. Disperse Blue 197, C. I. Disperse Blue 198, C. I. Disperse Blue 201, C. I. Disperse Blue 214, C. I. Disperse Blue 224, C. I. Disperse Blue 225, C. I. Disperse Blue 257, C. I. Disperse Blue 266, C. I. Disperse Blue 267, C. I. Disperse Blue 287, C. I. Disperse Blue 354, C. I. Disperse Blue 358, C. I. Disperse Blue 365 and C. I. Disperse Blue 368.

Green Disperse Dye

C. I. Disperse Green 6 and C. I. Disperse Green 9.

Among these disperse dyes, more preferred dyes are as follows:

Yellow Disperse Dye

C. I. Disperse Yellow 5, C. I. Disperse Yellow 42, C. I. Disperse Yellow 83, C. I. Disperse Yellow 93, C. I. Disperse Yellow 99, C. I. Disperse Yellow 198 and C. I. Disperse Yellow 224.

Orange Disperse Dye

C. I. Disperse Orange 29, C. I. Disperse Orange 49 and C. I. Disperse Orange 73.

Red Disperse Dye

C. I. Disperse Red 92, C. I. Disperse Red 126, C. I. Disperse Red 145, C. I. Disperse Red 152, C. I. Disperse Red 159, C. I. Disperse Red 177, C. I. Disperse Red 181, C. I. Disperse Red 206 and C. I. Disperse Red 283.

Blue Disperse Dye

C. I. Disperse Blue 60, C. I. Disperse Blue 87, C. I. Disperse Blue 128, C. I. Disperse Blue 154, C. I. Disperse Blue 201, C. I. Disperse Blue 214, C. I. Disperse Blue 224, C. I. Disperse Blue 257, C. I. Disperse Blue 287 and C. I. Disperse Blue 368.

In the present invention, other disperse dyes including novel dyes can be used without limitation. Wet-cake disperse dye products are preferably used in the present invention, because the wet-cake disperse dye products rapidly disperse in aqueous solvents to form fine particle dispersions with high efficiency. Use of the wet-cake products is, however, not essential in the present invention, because other products also result in excellent fine particle dispersions although dispersion efficiency for these is not so high.

(Dispersion Production)

An aqueous ink in accordance with the present invention is prepared by dispersing the above-mentioned disperse dye into the above-mentioned water-soluble urethane polymer. The disperse dye and the water-soluble urethane polymer at a weight ratio of 100:30 to 100:200 are preliminarily mixed before dispersion treatment. In the dispersion treatment, it is preferred to use dispersion media, such as glass beads, silica-alumina ceramic beads, zirconia beads and natural silica beads, e.g. Ottawa sand, in order to promote dispersion.

Commercially available dispersing devices, which disperse the disperse dye to obtain a given average particle size with high efficiency, may be used in the dispersion treatment. Examples of dispersing devices include ball mills and sand mills. High-speed sand mills are preferably used among these mills. Examples of the high-speed sand mills include Super Mill (trade name, hereinafter the same), Sand Grinder, Beads Mill, Agitator Mill, Grain Mill, Dyno Mill, Pearl Mill and Cobol Mill. Use of a roll mill or a jet mill promotes dispersion because the mill applies a high shear stress to the dispersed system without beads and the resulting dispersion contains minimal amounts of impurities.

In the present invention, the disperse dye particles in the dispersion must have an average size in a range from 80 nm to 250 nm. Since an ink-jet recording ink containing a disperse dye having an average size of greater than 250 nm has inferior dischargeability, the ink often clogs and thus a clear high quality image cannot be readily obtained. An average size of less than 80 nm deteriorates preservability and discharge stability of the ink and the start-up property at restart. Consequently, it is preferred that the average size be within the above-mentioned range.

Use of the water-soluble addition polymer in accordance with the present invention helps effective production of a dye dispersion having a particle size of 10 to 2,000 nm. Such a fine particle dispersion of the disperse dye can also be preferably used in ordinary dyeing processes.

In the present invention, a dispersion having the above-mentioned average size is obtained by the following methods, e.g. decreasing the size of grinding media in the dispersing device, classifying the dispersion by pressure filtration or centrifugal separation after dispersing and pressure filtration after aging. For example, coarse particles can be removed by centrifugal separation. In the present invention, fine disperse dye particles are effectively prepared due to use of the water-soluble urethane polymer as a dispersant. A desired dispersion can therefore be prepared under moderate centrifugal conditions without a large amount of precipitation.

The ink-jet recording ink in accordance with the present invention is prepared from the aqueous fine-particle dispersion of the disperse dye and a solvent is added according to its usage. Examples of usable solvents in accordance with the present invention include water-miscible humectant solvents used in conventional aqueous inks, such as monovalent alcohols, multivalent alcohols, and monoalkyl ethers thereof. In accordance with classification by the present inventors, the water-miscible humectant solvents are classified into the following three groups.

Group I: highly humectant, non-volatile, hydrophilic solvents.

Group II: volatile solvents having hydrophobic terminal groups and high wettability to hydrophobic surfaces.

Group III: low viscosity solvent having moderate wettability, e.g. monovalent alcohols.

It is therefore preferred that the solvent used for the ink in accordance with the present invention be selected from these solvents or mixtures of these solvents based on the above-mentioned properties. Preferably, the solvent contains a multivalent alcohol and/or monoalkyl ether thereof in the present invention. Preferably, the ink contains a water-soluble solvent in an amount of 5 to 40 percent by weight of the entire aqueous dispersion. A solvent content of less than 5 percent by weight deteriorates ink dischargeability and causes clogging, whereas a solvent content of greater than 40 percent by weight increases the viscosity of the dispersion and thus narrows the driving frequency range.

Examples of Group I solvents include ethylene glycol, diethylene glycol, triethylene glycol, tripropylene glycol, glycerine, 1,2,4-butanetriol, 1,2,6-hexanetriol, 1,2,5-pentane triol, 1,2-butanediol, 1,3-butanediol, 1,4-butanediol, dimethylsulfoxide, diacetone alcohol, monoallyl ether of glycerine, propylene glycol, butylene glycol, polyethylene glycol 300, thiodiglycol, N-methyl-2-pyrrolidone, 2-pyrrolidone, γ-butyrolactone, 1,3-dimethyl-2-imidazolidinone, sulfolane, trimethylolpropane, trimethylolethane, neopentyl glycol, ethylene glycol monomethyl ether, ethylene glycol monoethyl ether, ethylene glycol monoisopropyl ether, ethylene glycol monoallyl ether, diethylene glycol monomethyl ether, diethylene glycol mono-ethyl ether, triethylene glycol monomethyl ether, triethylene glycol monoethyl ether, propylene glycol monomethyl ether, dipropylene glycol monomethyl ether, bis(β-hydroxyethyl) sulfone, bis(β-hydroxyethyl) urea, acetonylacetone, pentaerythritol and 1,4-cyclohexane diol.

Examples of Group II solvents include hexylene glycol, ethylene glycol monopropyl ether, ethylene glycol monobutyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monoethyl ether, dipropylene glycol monopropyl ether, dipropylene glycol monobutyl ether, tripropylene glycol monomethyl ether, glycerine monoacetate, glycerine diacetate, glycerine triacetate, ethylene glycol monomethyl ether acetate, diethylene glycol monomethyl ether acetate, cyclohexanol, 1,2-cyclohexanediol, 1-butanol, 3-methyl-1,5-pentanediol, 3-hexene-2,5-diol, 2,3-butanediol, 1,5-pentanediol, 2,4-pentanediol and 2,5-hexanediol.

Examples of Group III solvents include ethanol, 1-propanol, 2-propanol, 1-methoxy-2-propanol, furfuryl alcohol and tetrahydrofurfuryl alcohol.

When an aqueous ink is prepared by mixing the aqueous dispersion of the disperse dye fine particles with the above-mentioned solvent, such as a polyvalent alcohol, it is preferable that the pH of the ink be adjusted to be within a neutral or basic range, that is, 5 to 10, and more preferably 7 to 9 with a pH adjustor. The ink has excellent preservability in the specified pH range. When forming images on textiles, dyeing properties and reduction washability and water washability after dyeing are improved in this pH range.

Examples of usable basic pH adjustors include inorganic bases, e.g. sodium hydroxide, potassium hydroxide, lithium hydroxide; and organic bases, e.g. ethanolamine, diethanolamine, triethanolamine, N-methylethanolamine, N-ethyldiethanol amine, 2-amino-2-methylpropanol, 2-ethyl-2-amino-1,3-propanediol, 2-(2-aminoethyl) ethanolamine, tris(hydroxymethyl)aminomethane, ammonia, glycine, glycylglycine, histidine, L-lysine, L-arginine, piperidine, morpholine and β-dihydroxyethyl urea. As described above, these pH adjustors are also used as neutralizers when the organic solvent is exchanged for an aqueous system in the synthesis of the water-soluble urethane polymer having a specified carboxylic acid value which is used for preparing an aqueous dispersion of disperse dye fine particles in accordance with the present invention.

When the ink in accordance with the present invention is applied to ink-jet recording processes, addition of a surfactant is preferred in view of (1) dyeing properties to textiles and (2) improvement in dischargeability from bubble-jet-type ink-jet apparatuses. Examples of usable surfactants include nonionic surfactants, e.g. naphthalenesulfonate-formaldehyde condensates and polyoxyethylene alkyl ethers; nonionic-anionic surfactants, e.g. polyoxyethylene alkyl ether and polyoxyethylene alkyl phenyl ether each having an anionic group selected from polyoxyethylene phosphoric acid and carboxylic acids and having a hydrophobic-liophobic-balance (HLB) of 10 or more. The surfactant and its content are determined in view of foaming characteristics.

When the aqueous ink in accordance with the present invention is used as an ink-jet printing ink, an antiseptic agent and/or a defoaming agent may be added. The types and contents of these additives are determined in consideration of miscibility in the aqueous medium.

Figure 1:
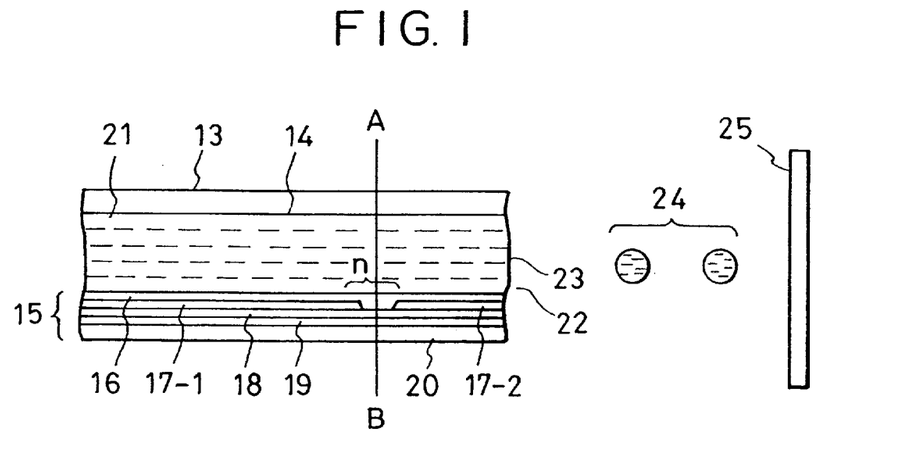
FIG. 1 is a vertical sectional view of a head of an ink-jet recording apparatus.
Figure 2:
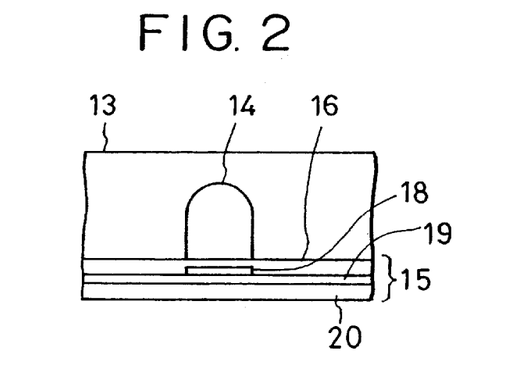
FIG. 2 is a cross-sectional view of a head of an ink-jet recording apparatus.

An embodiment of an ink-jet recording apparatus in accordance with the present invention which is suitable for ink-jet recording using the above-mentioned ink will now be described with reference to FIGS. 1 to 3. FIG. 1 is a cross-sectional view along the ink passage of a head and FIG. 2 is a cross-sectional view taken along sectional line A-B of FIG. 1.

The head 13 comprises a plate provided with at least one groove 14 as an ink passage, composed of glass, ceramic or plastic, and a thermal head 15 for heat-sensitive recording. The drawings exemplify a thin film head, but other types are also usable. The thermal head 15 comprises a protective film 16 composed of silicon oxide or the like, aluminum electrodes 17-1, 17-2, an exothermic resistor 18 composed of nichrome or the like, a heat accumulator 19 and a heat dissipating substrate 20 composed of aluminum or the like. Ink 21 forms a meniscus 23 at a fine discharge orifice 22 due to pressure not shown in the drawings.

When aluminum electrodes 17-1, 17-2 are energized in response to signal information, region n of the thermal head 15 is rapidly heated to form a bubble in the ink 21 which is in contact with the region. The meniscus 23 is protruded by the pressure due to the bubble to discharge the ink 21 as ink droplets 24. The ink 21 therefore is sputtered toward a recording medium 25 through the discharge orifice 22.

Figure 3:
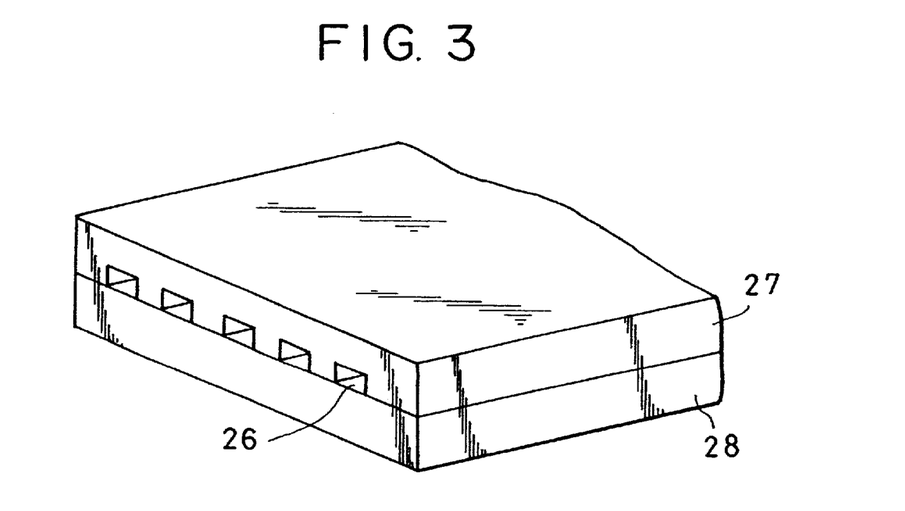
FIG. 3 is an isometric view of a multiple head comprising a plurality of heads shown in FIG. 1.

FIG. 3 is an isometric view of a multiple head comprising an array of a plurality of heads which have the same configuration as the head shown in FIG. 1. The multiple head is made by bonding a glass plate 27 provided with a plurality of grooves 26 (multiple-groove) and a thermal head 28 as in FIG. 1.

Figure 4:
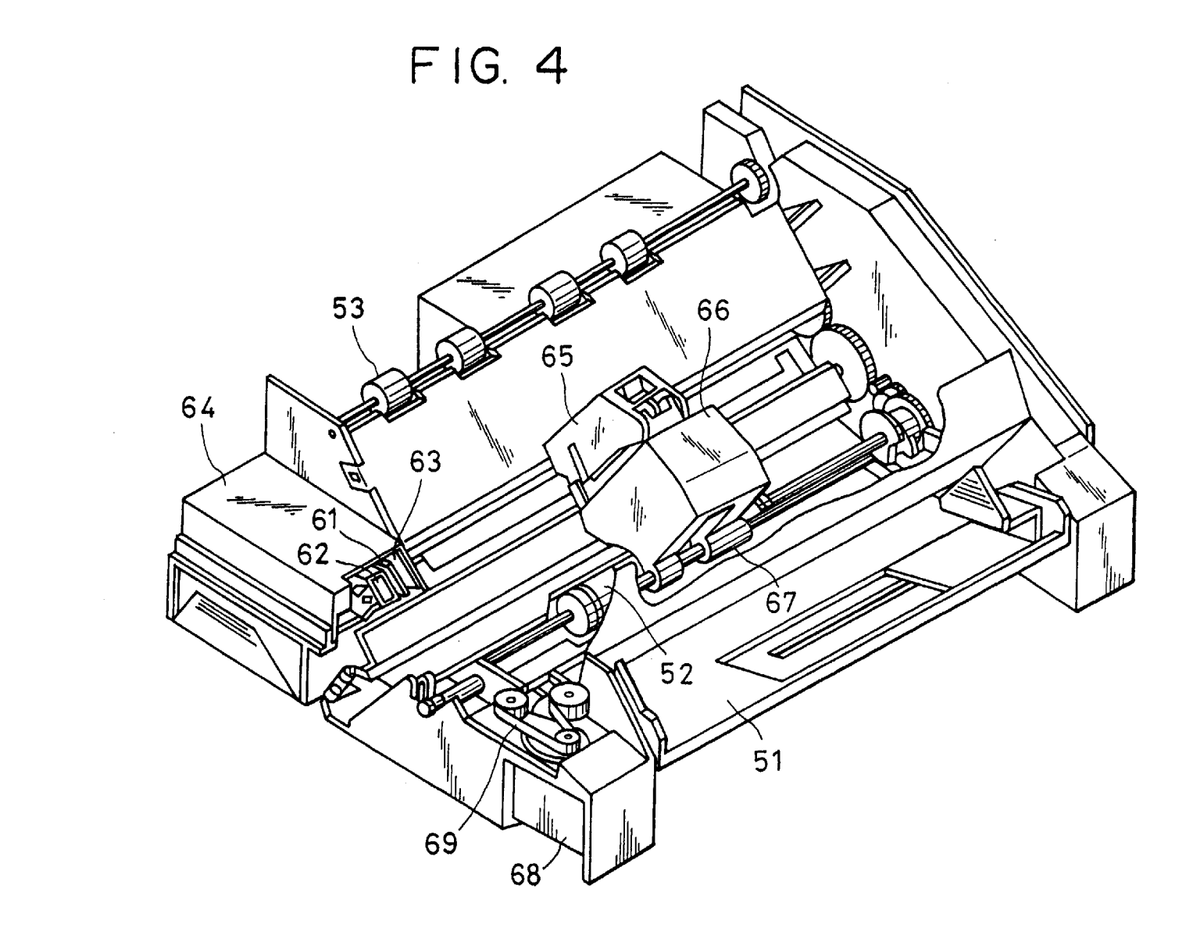
FIG. 4 is a perspective view of an ink-jet recording apparatus.

FIG. 4 is an isometric view of the interior of an ink-jet recording apparatus provided with the above-mentioned head. A blade 61 is a wiping member and its one edge is fixed to a blade holding member as a fixed end to form a cantilever. The blade 61 is arranged at a position adjacent to the recording region of a recording head 65 and protrudes to the travelling path of the recording head 65.

A cap 62 of the discharge orifice of the recording head 65 is arranged at a home position adjacent to the blade 61, and moves in the direction vertical to the moving direction of the recording head 65 so as to come into contact with the ink discharge orifice and cover the orifice. An ink absorber 63 is provided adjacent to the blade 61 so as to protrude to the travelling path of the recording head 65 as does the blade 61.

A discharge recovery section 64 consists of the blade 61, the cap 62 and the ink absorber 63, and the cap 62 and the ink absorber 63 remove water and dust on the ink discharge orifice. A recording head 65 is provided with an energy generating means and discharges ink on a recording medium facing the discharge orifice, and a carriage 66 bears and moves the recording head 65. The carriage 66 is mounted so as to slide along a guide axis 67, and is connected with a belt 69 driven by a motor 68. The carriage 66 thereby moves along the guide axis 67 over the region of recording by the recording head 65 and its neighborhood.

A recording medium is fed into a position facing the discharge orifice of the recording head 65 by a feeding roller 52 driven by a motor (not shown in the drawing) through a feeding section 51 of the recording apparatus, and exhausted to an outlet section provided with an exhausting roller 53.

When the recording head returns to the home position due to completion of recording or the like, the cap 62 of the discharge recovery section 64 is retracted from the travelling path of the recording head 65, and the blade 61 is protruded to the travelling path. As a result, the blade 61 wipes the discharge orifice of the recording head 65. When the cap 62 comes into contact with the discharge orifice of the recording head 65 to cover the discharge orifice, the cap 62 is moved to protrude to the travelling path of the recording head.

When the recording head 65 moves from the home position to a first recording position, the cap 62 and the blade 61 are arranged in the same position when the discharge orifice is wiped. As a result, the blade 61 again wipes the discharge orifice of the recording head 65.

The recording head 65 moves to the home position not only after completion of the recording and during the discharge recovery time period but also during the moving time period of the recording head 65 for recording at a given interval, and is wiped by the blade 61.

Figure 5:
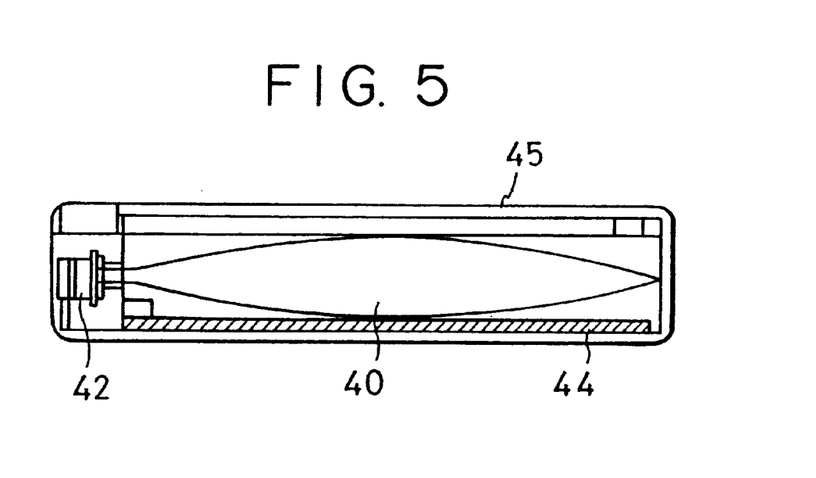
FIG. 5 is a vertical sectional view of an ink cartridge.

FIG. 5 is a cross-sectional view of an ink cartridge containing ink which is supplied to the head through an ink feeding member, for example, a tube. An ink reserving section 40 comprises, for example, an ink bag and contains ink supplied to the head. The top of the ink reserving section 40 is covered with a rubber stopper 42. A needle (not shown in the drawing) is inserted into the stopper 42 to feed the ink in the ink bag 40. The wasted ink is absorbed by an ink absorber 44. Preferably, the surface of the ink bag 40 which comes into contact with the ink is formed from polyolefin, and in particular, polyethylene.

Figure 6:
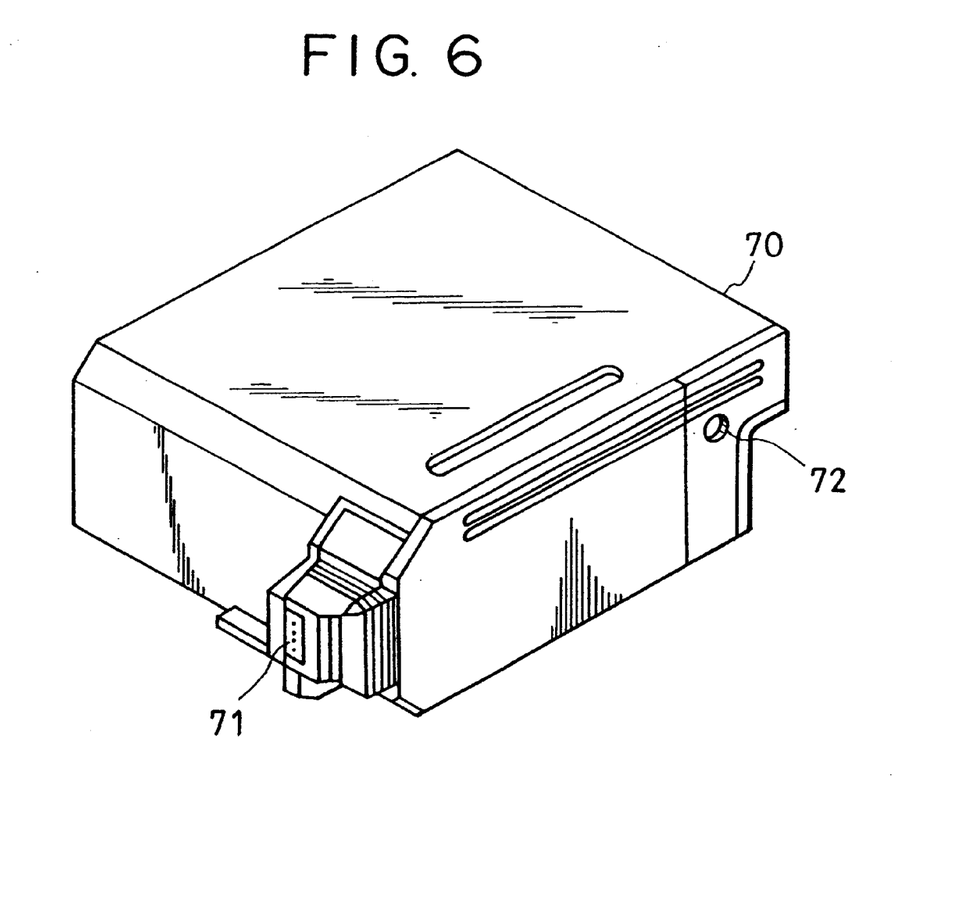
FIG. 6 is an isometric view of a recording unit.

The ink-jet recording apparatus in accordance with the present invention is not limited to the above-mentioned separate type in which the head and the ink cartridge are separately provided, and may be a consolidated type as shown in FIG. 6.

In FIG. 6, a recording unit 70 includes an ink reserving section, for example, an ink absorber, and ink in the ink absorber is discharged from a head section 71 provided with a plurality of orifices. Examples of preferred materials for the ink absorber include polyurethanes, cellulose and polyvinyl acetal. The interior of the recording unit is connected to the open air through an opening 72. The recording unit 70 is used instead of the recording head shown in FIG. 4 and is detachably fixed to the carriage 66.

EXAMPLES

The present invention will now be described in more detail with reference to examples and comparative examples. Hereinafter, "parts" and "%" represent "parts by weight" and "percent by weight", respectively, and "pbw" also represents "parts by weight".

Synthesis of Water-Soluble Urethane Polymer—1

Into a mixed solvent of methyl ethyl ketone and N-methylpyrrolidone, 141 g (0.50 mole) of carboxylated diol Compound 12 (molecular weight: 282) was dissolved so as to have a concentration of 30%. While maintaining the solution at 50° C., 80 g (0.475 mole) of hexamethylene diisocyanate was added dropwise to the solution and the solution was allowed to stand for 5 hours until the diisocyanate had completely reacted. After the diisocyanate was completely exhausted, the solution was neutralized with a 0.1 N aqueous sodium hydroxide solution, and methyl ethyl ketone was evaporated under reduced pressure while adding water in order to exchange the solvent to an N-methylpyrrolidone-water system. Water-soluble urethane polymer LUP-1 was prepared in such a manner. The resulting solution was light yellowish and clear, and the urethane polymer had a number average molecular weight of 7,500 and an acid value of 125.

Synthesis of Water-Soluble Urethane Polymer—2

Carboxylated diol Compound 17 was reacted with hexamethylene diisocyanate as in Synthesis of Water-Soluble Urethane Polymer—1. A water soluble urethane polymer LUP-2 having an acid value 230 and a number average molecular weight of 9,600 was prepared.

Synthesis of Water-Soluble Urethane Polymers—3 to 8

Water soluble urethane polymers LUP-3 to LUP-8 were prepared using materials shown in Table 1 as in Synthesis of Water-Soluble Urethane Polymer—1.

Synthesis of Water-Soluble Urethane Polymer—9

A water soluble urethane polymer LUP-9 was prepared from carboxylated diol Compound 17 having a molecular weight of 700 and hexamethylene diisocyanate as in Synthesis of Water-Soluble Urethane Polymer—1. The molar ratio of raw materials was Compound 17:caprolactone oligomer:hexamethylene diisocyanate=80:20:100. The resulting polymer LUP-9 had an acid value of 190 and a number average molecular weight of 7,200.

Table 1 shows the raw materials for synthesizing the water soluble urethane polymers LUP-1 to LUP-9, and acid values and number average molecular weights of the polymers.

TABLE 1

| Water-soluble urethane polymer | Raw materials | | Polymer properties | |
|---|---|---|---|---|
| | Carboxylated diol | Diisocyanate | Acid value | Mn |
| LUP-1 | Compound 12 | HMDI | 125 | 7,500 |
| LUP-2 | Compound 17 | HMDI | 230 | 9,600 |
| LUP-3 | Compound 17 | TDI | 115 | 11,000 |
| LUP-4 | Compounds 13 & 17 | TDI | 185 | 10,500 |
| LUP-5 | Compound 14 | MDI | 100 | 6,500 |
| LUP-6 | Compound 15 | MDI | 100 | 5,600 |
| LUP-7 | Compound 16 | HMDI | 140 | 4,900 |
| LUP-8 | Compounds 18 & 17 | IPDI | 250 | 8,400 |
| LUP-9 | Compound 17 | HMDI | 190 | 7,200 |

Mn: number average molecular weight,
HMDI: hexamethylene diisocyanate,
TDI: tolylene diisocyanate,
MDI: diphenylmethane diisocyanate,
IPDI: isophorone diisocyanate Using the resulting water-soluble urethane polymers LUP-1 to LUP-9, aqueous dispersions of disperse dye fine particles and inkjet inks containing these dispersions were prepared in accordance with Examples 1 to 9. Table 2 shows the compositions of these dispersions and inks with the compositions in the Comparative Examples.

Example 1

A dispersion DBL-1 and a blue ink-jet recording ink BL-1 were prepared as follows:
(Dispersion DBL-1)

C. I. Disperse Blue 60 wet cake (trial product, solid content:

| LUP-1 (45% aqueous solution neutralized with lithium hydroxide, pH: 7.3) | 10 pbw |
| C. I. Disperse Blue 60 wet cake (trial product, solid content: 40%) | 60 pbw as solid component |
| Diethylene glycol | 10 pbw |
| Isopropyl alcohol | 10 pbw |
| Water | 130 pbw |

These raw materials were placed into a batch-type vertical sand mill and mixed for 30 minutes. After feeding zirconium beads having 1 mm diameters as media, they were dispersed at 2,000 rpm for 5 minutes while cooling the mill with water. The dispersion had a viscosity of 5 mPa·S after mixing. Coarse particles were removed from the dispersion by centrifugal filtration at 5,000 rpm for 20 minutes. The resulting dispersion DBL-1 had a solid content of 11.5%, an average particle size of 165 nm, a surface tension of 46 mN/m and a pH of 7.2.

(Ink-Jet Recording Ink BL-1)

Using the resulting dispersion DBL-1, a blue ink-jet recording ink BL-1 was prepared according to the following procedure.

| Dispersion DBL-1 | 50 pbw |
| Diethylene glycol | 20 pbw |
| Isopropyl alcohol | 3 pbw |
| Water | 27 pbw |

Aqueous lithium hydroxide solution (pH adjustor) as needed

These components were thoroughly mixed and filtered through a 0.25 pm membrane filter under pressure. The resulting blue ink-jet recording ink BL-1 had a viscosity of 2.2 mPa·S, a surface tension of 40 mN/m and a pH of 8.5.

Example 2

A dispersion DBL-2 and blue ink-jet recording inks BL-2 and BL-3 were prepared as follows:
(Dispersion DBL-2)

| LUP-2 (50% aqueous solution neutralized with monoethanolamine, pH: 8.0) | 15 pbw |
| C. I. Disperse Blue 128 wet cake (solid content: 40%) | 50 pbw |
| Diethylene glycol | 10 pbw |
| Water | 120 pbw |

These raw materials were placed into a batch-type vertical sand mill and preliminarily mixed for 30 minutes. After feeding zirconium beads having 1 mm diameters as media, they were dispersed at 2,000 rpm for 5 minutes while cooling the mill with water. The dispersion had a viscosity of 6.0 mPa·S after mixing. Coarse particles were removed from the dispersion by centrifugal filtration at 8,000 rpm for 20 minutes. The resulting dispersion DBL-2 had a solid content of 12%, an average particle size of 125 nm, a surface tension of 45 mN/m and a pH of 7.8.
(Ink-Jet Recording Ink BL-2)

Using the resulting dispersion DBL-2, blue ink-jet recording inks BL-2 and BL-3 were prepared according to the following procedure.

Formulation for BL-2

| Dispersion DBL-2 | 30 pbw |
| Thiodiglycol | 10 pbw |
| Glycerine | 10 pbw |
| Water | 50 pbw |
| Monoethanolamine | as needed |

These components were thoroughly mixed and filtered through a 0.25 µm membrane filter under pressure. The resulting blue ink-jet recording ink BL-2 had a viscosity of 2.3 mPa·S, a surface tension of 44 mN/m and a pH of 9.0.

Formulation for BL-3

| Dispersion DBL-2 | 40 pbw |
| Thiodiglycol | 10 pbw |
| Glycerine | 10 pbw |
| Polyoxyethylene nonyl phenyl ether (HLB = 12) | 0.3 pbw |
| Water | 39.5 pbw |
| Trisodium citrate | 0.2 pbw |

These components were thoroughly mixed and filtered through a 0.25 µm membrane filter under pressure. The resulting blue ink-jet recording ink BL-3 had a viscosity of 2.2 mPa·S, a surface tension of 37 mN/m and a pH of 8.6.

Example 3

A dispersion DY-1 and a yellow ink-jet recording ink Y-1 were prepared as follows:
(Dispersion DY-1)

| LUP-3 (47.5% aqueous solution neutralized with lithium hydroxide, pH: 9.0) | 10 pbw |
| C. I. Disperse Yellow 64 wet cake (trial product, solid content: 30%) | 90 pbw as solid component |
| Diethylene glycol | 10 pbw |
| Water | 80 pbw |

These raw materials were dispersed as in Example 1. The dispersion had a viscosity of 4.5 mPa·S after mixing. Coarse particles were removed by centrifugal filtration as in Example 1. The resulting dispersion DY-1 had a solid content of 16%, an average particle size of 147 nm, a surface tension of 44 mN/m and a pH of 8.5.
(Ink-Jet Recording Ink Y-1)

Using the resulting dispersion DY-1, the yellow ink-jet recording ink Y-1 was prepared according to the following procedure.

| Dispersion DY-1 | 30 pbw |
| Ethylene glycol | 15 pbw |
| N-methylpyrrolidone | 10 pbw |
| Water | 45 pbw |
| Aqueous lithium hydroxide solution | as needed |

These components were thoroughly mixed and filtered through a 0.25 µm membrane filter under pressure. The resulting yellow ink jet recording ink Y-1 had a viscosity of 2.2 mPa·S, a surface tension of 43 mN/m and a pH of 9.5.

Example 4

A dispersion DBk-1 and black ink-jet recording inks Bk-1 and Bk-2 were prepared as follows:
(Dispersion DBk-1)

| LUP-4 (40% aqueous solution neutralized with monoethanolamine, pH: 7.3) | 13 pbw |
| C. I. Disperse Orange 13 (powder) | 12 pbw |
| C. I. Disperse Red 152 (powder) | 1 pbw |
| C. I. Disperse Blue 186 (powder) | 5 pbw |
| C. I. Disperse Blue 204 (powder) | 6 pbw |
| Diethylene glycol | 10 pbw |
| Water | 135 pbw |
| Defoamer Surfinol 104E (made by Nisshin Kagaku K. K.) | small amount |

Defoamer Surfinol 104E (made by Nisshin Kagaku K. K.) small amount

These raw materials were dispersed as in Example 1. The dispersion had a viscosity of 3.8 mPa·S after mixing. Coarse particles were removed by centrifugal filtration as in Example 1. The resulting dispersion DBk-1 had a solid content of 12%, an average particle size of 170 nm, a surface tension of 43 mN/m and a pH of 7.0.
(Ink-Jet Recording Inks Bk-1 and Bk-2)

Using the resulting dispersion DBk-1, the black ink-jet recording inks Bk-1 and Bk-2 were prepared according to the following procedure.

Formulation for Bk-1

| Dispersion Dbk-1 | 55 pbw |
| Bis(2-hydroxyethyl) sulfone | 15 pbw |
| Thiodiglycol | 10 pbw |
| Water | 20 pbw |
| Monoethanolamine | as needed |

These components were thoroughly mixed and filtered through a 0.25 µm membrane filter under pressure. The resulting black ink-jet recording ink Bk-1 had a viscosity of 2.8 mPa·S, a surface tension of 41 mN/m and a pH of 8.0.

Formulation for Bk-2

| Dispersion DBk-1 | 55 pbw |
| Bis(2-hydroxyethyl) sulfone | 15 pbw |
| Thiodiglycol | 10 pbw |
| Sodium lauryl sulfate | 0.5 pbw |
| Water | 19.5 pbw |
| Monoethanolamine | as needed |

These components were thoroughly mixed and filtered through a 0.25 µm membrane filter under pressure. The resulting black ink-jet recording ink Bk-2 had a viscosity of 2.5 mPa·S, a surface tension of 38 mN/m and a pH of 8.5.

Example 4

A dispersion DBk-1 and black ink-jet recording inks Bk-1 and Bk-2 were prepared as follows:
(Dispersion DBk-1)

| LUP-4 (40% aqueous solution neutralized with monoethanolamine, pH: 7.3) | 13 pbw |
| C. I. Disperse Orange 13 (powder) | 12 pbw |
| C. I. Disperse Red 152 (powder) | 1 pbw |

-continued

| | |
|---|---|
| C. I. Disperse Blue 186 (powder) | 5 pbw |
| C. I. Disperse Blue 204 (powder) | 6 pbw |
| Diethylene glycol | 10 pbw |
| Water | 135 pbw |
| Defoamer Surfinol 104E (made by Nisshin Kagaku K. K.) | small amount |

These raw materials were dispersed as in Example 1. The dispersion had a viscosity of 3.8 mPa·S after mixing. Coarse particles were removed by centrifugal filtration as in Example 1. The resulting dispersion DBk-1 had a solid content of 12%, an average particle size of 170 nm, a surface tension of 43 mN/m and a pH of 7.0.

(Ink-Jet Recording Inks Bk-1 and Bk-2)

Using the resulting dispersion DBk-1, the black ink-jet recording inks Bk-1 and Bk-2 were prepared according to the following procedure.

Formulation for Bk-1

| | |
|---|---|
| Dispersion DBK-1 | 55 pbw |
| Bis(2-hydroxyethyl) sulfone | 15 pbw |
| Thiodiglycol | 10 pbw |
| Water | 20 pbw |
| Monoethanolamine | as needed |

These components were thoroughly mixed and filtered through a 0.25 μm membrane filter under pressure. The resulting black ink-jet recording ink Bk-1 had a viscosity of 2.8 mPa·S, a surface tension of 41 mN/m and a pH of 8.0.

Formulation for Bk-2

| | |
|---|---|
| Dispersion DBK-1 | 55 pbw |
| Bis(2-hydroxyethyl) sulfone | 15 pbw |
| Thiodiglycol | 10 pbw |
| Sodium lauryl sulfate | 0.5 pbw |
| Water | 19.5 pbw |
| Monoethanolamine | as needed |

These components were thoroughly mixed and filtered through a 0.25 μm membrane filter under pressure. The resulting black ink-jet recording ink Bk-2 had a viscosity of 2.5 mPa·S, a surface tension of 38 mN/m and a pH of 8.5.

Example 5

A dispersion DR-1 and a red ink-jet recording ink R-1 were prepared as follows:

(Dispersion DR-1)

| | |
|---|---|
| LUP-5 (45% aqueous solution neutralized with monoethanolamine, pH: 6.8) | 20 pbw |
| C. I. Disperse Red 54 (powder) | 25 pbw |
| Ethylene glycol | 10 pbw |
| Defoamer Surfinol 104E (made by Nisshin Kagaku K. K.) | small amount (<1 pbw) |
| Water | 145 pbw |

These raw materials were dispersed as in Example 1. The dispersion had a viscosity of 5.5 mPa·S. Coarse particles were removed by centrifugal filtration as in Example 1. The resulting dispersion DR-1 had a solid content of 13%, an average particle size of 143 nm, a surface tension of 42 mN/m and a pH of 6.5.

Using the resulting dispersion DR-1, the red ink-jet recording ink R-1 was prepared according to the following procedure.

(Ink-Jet Recording Ink R-1)

| | |
|---|---|
| Dispersion DR-1 | 35 pbw |
| Ethylene glycol | 10 pbw |
| Triethylene glycol | 15 pbw |
| Urea | 5 pbw |
| Water | 35 pbw |
| Aqueous lithium hydroxide solution | as needed |

These components were thoroughly mixed and filtered through a 0.25 μm membrane filter under pressure. The resulting red ink-jet recording ink R-1 had a viscosity of 2.2 mPa·S, a surface tension of 42 mN/m and a pH of 8.0.

Example 6

A dispersion DR-2 and a red ink-jet recording ink R-2 were prepared as follows:

(Dispersion DR-2)

| | |
|---|---|
| LUP-6 (50% aqueous solution neutralized with monoethanolamine, pH: 6.8) | 12 pbw |
| C. I. Disperse Red 152 (powder) | 25 pbw |
| Ethylene glycol | 10 pbw |
| Water | 150 pbw |
| Ethanol | 5 pbw |

These raw materials were dispersed as in Example 1. The dispersion had a viscosity of 6.5 mPa·S. Coarse particles were removed by centrifugal filtration as in Example 1. The resulting dispersion DR-2 had a solid content of 11%, an average particle size of 155 nm, a surface tension of 45 mN/m and a pH of 6.5.

Using the resulting dispersion DR-2, the red ink-jet recording ink R-2 was prepared according to the following procedure.

(Ink-Jet Recording Ink R-2)

| | |
|---|---|
| Dispersion DR-2 | 45 pbw |
| Ethylene glycol | 10 pbw |
| Glycerine | 15 pbw |
| Triethylene glycol mono-n-butyl ether | 6 pbw |
| Water | 24 pbw |
| Aqueous lithium hydroxide solution | as needed |

These components were thoroughly mixed and filtered through a 0.25 μm membrane filter under pressure. The resulting red ink-jet recording ink R-2 had a viscosity of 2.4 mPa·S, a surface tension of 43 mN/m and a pH of 8.0.

Example 7

A dispersion DOr-1 and an orange ink-jet recording ink Or-1 were prepared as follows:

(Dispersion DOr-1)

| | |
|---|---|
| LUP-7 (40% aqueous solution neutralized with monoethanolamine, pH: 7.2) | 20 pbw |
| C. I. Disperse Orange 13 (powder) | 25 pbw |
| Ethylene glycol | 10 pbw |
| Defoamer Surfinol 104E (made by Nisshin Kagaku K. K.) | small amount (<1 pbw) |
| Water | 145 pbw |

These raw materials were dispersed as in Example 1. The dispersion had a viscosity of 4.0 mPa·S. Coarse particles were removed by centrifugal filtration as in Example 1. The resulting dispersion DOr-1 had a solid content of 12%, an average particle size of 155 nm, a surface tension of 42 mN/m and a pH of 7.0.

Using the resulting dispersion DOr-1, the orange ink-jet recording ink Or-1 was prepared according to the following procedure.

(Ink-Jet Recording Ink Or-1)

| | |
|---|---|
| Dispersion DOr-1 | 35 pbw |
| Diethylene glycol | 15 pbw |
| Triethylene glycol | 5 pbw |
| Urea | 10 pbw |
| Water | 35 pbw |
| Aqueous lithium hydroxide solution | as needed |

These components were thoroughly mixed and filtered through a 0.25 μm membrane filter under pressure. The resulting orange ink-jet recording ink Or-1 had a viscosity of 2.2 mPa·S, a surface tension of 42 mN/m and a pH of 8.5.

Example 8

A dispersion DY-2 and a yellow ink-jet recording ink Y-2 were prepared as follows:

(Dispersion DY-2)

| | |
|---|---|
| LUP-8 (45% aqueous solution neutralized with sodium hydroxide, pH: 7.0) | 12 pbw |
| C. I. Disperse Yellow 64 wet cake (trial product, solid content: 30%) | 80 pbw |
| Ethylene glycol | 10 pbw |
| Water | 100 pbw |

These raw materials were dispersed as in Example 1. The dispersion had a viscosity of 4.0 mPa·S after mixing. Coarse particles were removed by centrifugal filtration as in Example 1. The resulting dispersion DY-2 had a solid content of 13.5%, an average particle size of 143 nm, a surface tension of 42 mN/m and a pH of 6.5.

Using the resulting dispersion DY-2, the yellow ink-jet recording ink Y-2 was prepared according to the following procedure.

(Ink-Jet Recording Ink Y-2)

| | |
|---|---|
| Dispersion DY-2 | 35 pbw |
| Ethylene glycol | 10 pbw |
| 1,2,6-Hexanetriol | 10 pbw |
| Urea | 5 pbw |
| Water | 39.5 pbw |
| Sodium lauryl sulfate | 0.5 pbw |

These components were thoroughly mixed and filtered through a 0.25 μm membrane filter under pressure. The resulting yellow ink-jet recording ink Y-2 had a viscosity of 2.5 mPa·S, a surface tension of 38 mN/m and a pH of 8.0.

Example 9

A dispersion DBk-2 was prepared as in Example 4, except that LUP-9 was used instead of LUP-4 in Example 4. The resulting dispersion DBk-2 had a solid content of 13%, an average particle size of 240 nm, a surface tension of 46 mN/m and a pH of 8.3.

Using the resulting dispersion DBk-2, the black ink-jet recording ink Bk-3 was prepared according to the following procedure.

(Ink-Jet Recording Ink Bk-3)

| | |
|---|---|
| Dispersion DBk-2 | 40 pbw |
| Diethylene glycol | 15 pbw |
| Ethylene glycol | 10 pbw |
| Isopropyl alcohol | 2 pbw |
| Water | 33 pbw |
| Sodium citrate | as needed |

These components were thoroughly mixed and filtered through a 0.25 μm membrane filter under pressure. The resulting black ink-jet recording ink Bk-3 had a viscosity of 2.6 mPa·S, a surface tension of 43 mN/m and a pH of 8.0.

Example 10

A dispersion DY-3 and a yellow ink-jet recording ink Y-3 were prepared as follows:

(Dispersion DY-3)

LUP-8 (45% aqueous solution neutralized with lithium hydroxide,

| | |
|---|---|
| LUP-8 (45% aqueous solution neutralized with lithium hydroxide, pH: 7.5) | 200 pbw |
| C. I. Disperse Yellow 64 wet cake (trial product, solid content: 30%) | 800 pbw |
| Glycerine | 100 pbw |
| Water | 1000 pbw |

These raw materials were preliminarily mixed by a high-speed homogenizer for 30 minutes and dispersed by a continuous sand mill, Dyno Mill (Shinmaru Enterprise Co.), until the average particle size of the dispersion became 145 nm. The dispersion was centrifuged. The resulting dispersion DY-3 had a solid content of 10.5%, an average particle size of 80 nm, a surface tension of 50 mN/m and a pH of 5.5.

Using the resulting dispersion DY-3, the yellow ink-jet recording ink Y-3 was prepared according to the following procedure.

(Ink-Jet Recording Ink Y-3)

| | |
|---|---|
| Dispersion DY-3 | 33 pbw |
| Diethylene glycol | 15 pbw |
| Thiodiglycol | 10 pbw |
| Water | 42 pbw |

These components were thoroughly mixed and filtered through a 0.25 μm membrane filter under pressure. The resulting yellow ink-jet recording ink Y-3 had a viscosity of 2.3 mps, a surface tension of 50 mN/m and a pH of 5.5.

Comparative Example 1

A dispersion C-1 was prepared as in Example 1, except that ethanolamine salt of Demol N (made by Kao Corporation) being a naphthalenesulfonate-type dispersant was used instead of LUP-1. The resulting dispersion C-1 had a solid content of 18%, an average particle size of 250 nm, a surface tension of 56 mN/m, a viscosity of 5.8 mPa·S and a pH of 7.5.

Using the resulting dispersion C-1, a blue ink-jet recording ink IC-1 was prepared according to the following procedure.

(Ink-Jet Recording Ink IC-1)

| Dispersion C-1 | 43 pbw |
|---|---|
| Ethylene glycol | 15 pbw |
| Isopropyl alcohol | 4 pbw |
| Monoethanolamine | 1 pbw |
| Water | 37 pbw |

These components were thoroughly mixed and filtered through a 0.25 μm membrane filter under pressure. The resulting blue ink-jet recording ink IC-1 had a viscosity of 2.2 mPa·S, a surface tension of 49 mN/m and a pH of 9.0.

Comparative Example 2

A dispersion C-2 was prepared as in Example 2, except that a water-soluble lignin sulfonate resin (Koparchin Soda Kop-44, made by KOHJIN Co., Ltd.) was used instead of LUP-2. The resulting dispersion C-2 after centrifugal treatment had a solid content of 22%, an average particle size of 300 nm, a surface tension of 50 mN/m, a viscosity of 8.5 mPa·S and a pH of 7.7.

Using the resulting dispersion C-2, a blue ink-jet recording ink IC-2 was prepared according to the following procedure.

(Ink-Jet Recording Ink IC-2)

| Dispersion C-2 | 45 pbw |
|---|---|
| Ethylene glycol | 10 pbw |
| Glycerine | 10 pbw |
| Monoethanolamine | 1 pbw |
| Water | 34 pbw |

These components were thoroughly mixed and filtered through a 0.25 μm membrane filter under pressure. The resulting blue ink-jet recording ink IC-2 had a viscosity of 2.8 mPa·S, a surface tension of 46 mN/m and a pH of 8.8.

Comparative Example 3

A dispersion C-3 was prepared as in Example 2, except that sodium salt of styrene-acrylic acid-butyl acrylate copolymer (a trial product made by Seiko Chemical Industries Co., Ltd., acid value: 150, weight average molecular weight: 9,000) was used instead of LUP-2. The resulting dispersion C-3 after centrifugal treatment had a solid content of 10%, an average particle size of 160 nm, a surface tension of 50 mN/m, a viscosity of 8.5 mPa·S and a pH of 8.0.

Using the resulting dispersion C-3, a blue ink-jet recording ink IC-3 was prepared according to the following procedure.

(Ink-Jet Recording Ink IC-3)

| Dispersion C-3 | 45 pbw |
|---|---|
| Ethylene glycol | 10 pbw |
| Glycerine | 10 pbw |
| Monoethanolamine | 1 pbw |
| Water | 34 pbw |

These components were thoroughly mixed and filtered through a 0.25 μm membrane filter under pressure. The resulting blue ink-jet recording ink IC-3 had a viscosity of 2.8 mPa·S, a surface tension of 46 mN/m and a pH of 8.8.

Comparative Example 4

An acrylic-modified carboxylated urethane emulsion was prepared by a method similar to the synthesis of the water-soluble urethane polymer LUP-1 in Synthesis of Water-Soluble Urethane Polymer—1.

Into a mixed solvent of methyl ethyl ketone and N-methylpyrrolidone, 163 g (0.50 mole) of carboxylated diol Compound 17 (molecular weight: 326) was dissolved so as to have a concentration of 30%. While maintaining the solution at 50 °C., 89.1 g (0.53 mole) of hexamethylene diisocyanate was added dropwise to the solution and the solution was allowed to stand for 5 hours until the diisocyanate had completely reacted. After the hydroxyl groups were completely exhausted, the polymer was allowed to react with 2-hydroxyethyl acrylate to form terminal acryloyl groups. To 150 pbw (solid components) of the synthesized urethane polymer, 25 pbw of styrene and 25 pbw of t-butyl methacrylate were added together with azobisisobutyronitrile as a catalyst for graft polymerization. The resulting graft polymer solution was neutralized with aqueous ammonia, and methyl ethyl ketone was evaporated while adding water in order to exchange the solvent to an N-methylpyrrolidone-water system. Acrylic-grafted urethane polymer emulsion LUAP was prepared in such a manner. The resulting emulsion had an acid value of 154.

The emulsion had ampholytic characteristics, that is, a hydrophilic or water-soluble characteristic due to carboxylated urethane segments and a hydrophobic or water-insoluble characteristic due to acrylic segments.

Using the acrylic-grafted urethane polymer emulsion LUAP as a dispersant, a dispersion DBLC and a blue ink-jet recording ink IC-4 were prepared according to the following procedure.

(Dispersion DBLC)

| LUAP (45% aqueous solution neutralized with ammonia, pH: 7.2) | 12 pbw |
|---|---|
| C. I. Disperse Blue 60 wet cake (trial product, solid content: 40%) | 60 pbw |
| Diethylene glycol | 10 pbw |
| Isopropyl alcohol | 10 pbw |
| Water | 130 pbw |

These raw materials were dispersed as in Example 1. The resulting dispersion DBLC had a solid content of 10.2%, an average *1 O particle size of 135 nm, a surface tension of 43 mN/m and a pH of 7.0.

Using the resulting dispersion DBLC, the blue ink-jet recording ink IC-4 was prepared according to the following procedure.

(Ink-Jet Recording Ink IC-4)

| Dispersion DBLC | 35 pbw |
|---|---|
| Diethylene glycol | 10 pbw |
| Glycerine | 10 pbw |
| Water | 45 pbw |
| Monoethanolamine | small amount |

These components were thoroughly mixed and filtered through a 0.25 μm membrane filter under pressure. The resulting blue ink-jet recording ink IC-4 had a viscosity of 2.6 mPa·S, a surface tension of 42 mN/m and a pH of 9.2.

TABLE 2

Dispersant, Dispersion and Dye for Ink-Jet Recording Ink

| | Ink | Dispersion Name | Size (nm) | Dispersant Name | Acid value | Dye |
|---|---|---|---|---|---|---|
| Example 1 | BL-1 | DBL-1 | 165 | LUP-1 | 125 | C.I.DBL-60 (wet cake) |
| Example 2 | BL-2 | DBL-2 | 125 | LUP-2 | 230 | C.I.DBL-128 (wet cake) |
| | BL-3 | DBL-2 | 125 | LUP-2 | 230 | C.I.DBL-128 (wet cake) |
| Example 3 | Y-1 | DY-1 | 147 | LUP-3 | 115 | C.I.DY-64 (wet cake) |
| Example 4 | Bk-1 | DBk-1 | 170 | LUP-4 | 185 | C.I.DOR-13 C.I.DR-152 C.I.DBL-186 C.I.DBL-264 (all powder) |
| | Bk-2 | DBk-1 | 170 | LUP-4 | 185 | C.I.DOR-13 C.I.DR-152 C.I.DBL-186 C.I.DBL-264 (all powder) |
| Example 5 | R-1 | DR-1 | 143 | LUP-5 | 110 | C.I.DR-54 (powder) |
| Example 6 | R-2 | DR-2 | 155 | LUP-6 | 100 | C.I.DR-152 (powder) |
| Example 7 | Or-1 | DOr-1 | 155 | LUP-7 | 140 | C.I.DOR-152 (powder) |
| Example 8 | Y-2 | DY-2 | 143 | LUP-8 | 250 | C.I.DY-64 (wet cake) |
| Example 9 | Bk-3 | DBk-2 | 240 | LUP-9 | 190 | same as Example 4 |
| Example 10 | Y-3 | DY-3 | 80 | LUP-8 | 250 | C.I.DY-64 (wet cake) |
| Comparative Example 1 | IC-1 | C-1 | 250 | naphthalene sulfonic acid | — | C.I.DBL-60 (wet cake) |
| Comparative Example 2 | IC-2 | C-2 | 300 | lignin sulfonic acid | — | C.I.DBL-128 (wet cake) |
| Comparative Example 3 | IC-3 | C-3 | 160 | styrene-acrylic acid | 150 | C.I.DBL-128 (wet cake) |
| Comparative Example 4 | IC-4 | C-4 | 135 | acrylic urethane emulsion | 154 (LUAP) | C.I.DBL-60 (wet cake) |

Evaluation

Ink-jet recording inks of Examples 1 to 10 and Comparative Examples 1 to 4 were tested for evaluating (1) durability of printed image, (2) preservability, (3) printing and dyeing characteristics on textiles and (4) applicability to textile dyeing processes under the following procedures and criteria. The results are shown in Table 3.

(1) Durability Test of Printed Image

Each ink was loaded into an ink-jet recording unit provided with a 360 dpi bubble-jet recording head having 64 nozzles through an ink supply tube. The recording unit had a driving frequency of 6.2 kHz, and a droplet volume per dot of 80 ng. Under such conditions, a consecutive discharge test of $3 \times 10^8$ pulses was performed using every second nozzle, or 32 nozzles in total.

The printed image including characters, solid image patterns and ruled lines before the consecutive discharge test was compared with that after the test to evaluate deterioration of the image quality. The results according to the following criteria are shown in Table 3.

(Criteria)

S (excellent): Clear characters with high density. Discharge speed of droplets does not decrease.

A (good): Clear characters, uniform clear solid images, and straight ruled lines.

B (fair): Slightly blurred characters, solid images with decreased density, slightly wavy ruled lines.

C (no good): Blurred characters being hard to read, nonuniform pale solid images and wavy ruled lines. Occasional discharge failure.

Ranks S and A satisfy practical levels.

(2) Preservability Test

Into a 100 ml shot heat resistant bottle, 50 ml of ink-jet recording ink was placed and maintained at 60° C. for a month for an accelerated preservation test. The viscosity after the preservation test was measured and the precipitation was observed. The preservability was determined according to the following criteria. The results are shown in Table 3.

(Criteria)

S (excellent): No substantial change in viscosity or pH was observed, or an increase in average particle size within 20%.

A (good): An increase in viscosity within 10% and very low precipitation was found, or an increase in average particle size within 20% to 50%.

B (fair): An increase in viscosity within 10% to 50% and precipitation was found. The precipitation is not redispersed.

C (no good): Gelation or firm precipitation.

Ranks A and B are practical levels.

(3) Printing and Dyeing Tests on Textile

A color image was recorded on a textile using a bubble-jet printer BJC-600 made by Canon Kabushiki Kaisha. A polyester de Chine as a textile was padded with a 1% aqueous polyvinylpyrrolidone solution (squeezing ratio: 80%), dried and adhered onto a Mylar film with a double-sided adhesive tape. After printing a color image, the textile was peeled from the Mylar film and was subjected to high temperature (HT) steaming treatment at 180° C. for 5 minutes. A polyester printed textile was obtained through conventional reduction washing, washing with water and drying. The printed textile was evaluated by coloring density, tone and sharpness according to the following criteria. The results are shown in Table 3.

(Criteria)

S (excellent): All items are satisfactory.

A (good): Slight bleeding at boundaries between different colors.

B (fair): Slightly low coloring density with bleeding.

C (no good): Slightly low coloring density with bleeding and unstable to washing.

(4) Applicability Test to Textile Dyeing Processes

Printing and steam treatments according to "(3) Printing and Dyeing Tests on Textile" were performed on a polyester textile and a cotton textile. Polyester and cotton printed textiles were obtained through conventional reduction washing, washing with water and drying. These printed textiles were evaluated by (4-1) feeling and (4-2) cotton staining resistance according to the following criteria. The results are shown in Table 3.

(Criteria)

(4-1: Feeling by Touching)

A (good): Practically satisfactory level.

B (fair): Practical level but slightly hard.

C (no good): Very hard for practical use.

(4-2: Cotton Staining Resistance by Grey Scale Evaluation)

A (good): 4th grade or more.

B (fair): 3rd grade or more.

C (no good): less than 3rd grade.

TABLE 3

| | | Test Results | | | | |
|---|---|---|---|---|---|---|
| | | Durability | | | Process applicability | |
| | Ink | of printed image | Preservability | Dyeing test | Feeling | Cotton staining resistance |
| Example 1 | BL-1 | S | A | S | A | A |
| Example 2 | BL-2 | S | A | S | A | A |
| | BL-3 | S | A | S | A | A |
| Example 3 | Y-1 | S | A | S | A | A |
| Example 4 | Bk-1 | S | A | S | A | A |
| | Bk-2 | S | A | S | A | A |
| Example 5 | R-1 | S | A | S | A | A |
| Example 6 | R-2 | S | A | S | A | A |
| Example 7 | Or-1 | S | A | S | A | A |
| Example 8 | Y-2 | S | A | S | A | A |
| Example 9 | Bk-3 | S | A | S | A | A |
| Example 10 | Y-3 | S | A | S | A | A |
| Comparative Example 1 | IC-1 | A | B | A | A | A |
| Comparative Example 2 | IC-2 | A | B | A | A | A |

TABLE 3-continued

| | | Test Results | | | | |
|---|---|---|---|---|---|---|
| | | Durability | | | Process applicability | |
| | Ink | of printed image | Preservability | Dyeing test | Feeling | Cotton staining resistance |
| Comparative Example 3 | IC-3 | B | B | A | B | C |
| Comparative Example 4 | IC-4 | A | S | A | B | C |

As described above, in an aqueous dispersion of disperse dye fine particles of the present invention, the fine particles are satisfactorily dispersed, the dispersion contains a high content of solid components and has a low viscosity and excellent preservability for long periods.

Further, an ink-jet recording ink and an ink-jet textile-printing ink using this dispersion have excellent applicability to textile-dyeing processes due to easy washing after dyeing and high cotton staining resistance and the like. These inks discharge stably during color recording on textiles. The dyed textiles have excellent coloring characteristics, stability, feeling and cotton staining resistance.

While the present invention has been described with reference to what are presently considered to be the preferred embodiments, it is to be understood that the invention is not limited to the disclosed embodiments. To the contrary, the invention is intended to cover various modifications and equivalent arrangements, included within the spirit and scope of the appended claims. The scope of the following claims is to be accorded the broadest interpretation so as to encompass all such modifications and equivalent structures and functions.

What is claimed is:

1. A polymer produced from a carboxylated diol represented by the following general formula (I) and a polyisocyanate, and having an acid value in a range from 100 to 250:

(I)

wherein A is an aromatic, alicyclic or aliphatic polybasic acid residue, and B is a trivalent aliphatic alcohol residue that is not grafted with vinyl monomer.

2. A polymer according to claim 1, wherein said residue A in the general formula (I) has a structure selected from the group consisting of the following chemical formulae (1) to (6):

(1)

(2)

-continued (3)

(4)

(5)

(6)

wherein R in the chemical formula (1) is a carboxyl or alkyl group.

3. A polymer according to claim 1, wherein said residue A is derived from a dicarboxylic acid or anhydride thereof selected from the group consisting of phthalic acid, trimellitic acid, Endic acid: 3,6-endomethylene-$\Delta^4$-tetrahydrophthalic acid, tetrahydrophthalic acid, hexahydrophthalic acid, cyclopentane-1,3-dicarboxylic acid and cyclohexane-1,4-dicarboxylic acid.

4. A polymer according to claim 1, wherein said residue A is derived from adipic acid, succinic acid, malonic acid, sebacic acid and fumaric acid.

5. A polymer according to claim 1, wherein said residue B is derived from an aliphatic polyvalent alcohol selected from the group consisting of trimethylolpropane, trimethylolethane, trimethylolmethane, 2-hydroxymethyl-1,6-hexanediol, 2-hydroxymethyl-1,4-butanediol and 2-hydroxymethyl-1,5-pentanediol.

6. A polymer according to claim 1, having a number average molecular weight of 2,500 to 30,000.

7. A polymer according to claim 1, wherein said carboxylated diol represented by the general formula (I) is a compound selected from the group consisting of the following Compounds (12) to (18):

Compound (12)

-continued

Compound (13)

Compound (14)

Compound (15)

Compound (16)

Compound (17)

Compound (18)

8. A polymer according to claim 1, wherein said polyisocyanate is a compound selected from the group consisting of 2,4-tolylene diisocyanate, 2,6-tolylene diisocyanate, hexamethylene diisocyanate, m-phenylene diisocyanate, p-phenylene diisocyanate, 4,4'-diphenylmethane diisocyanate, tetramethylene diisocyanate, isophorone diisocyanate, xylylene diisocyanate, bis(isocyanatomethyl) cyclohexane, dicyclohexylmethane diisocyanate, lysine diisocyanate, trimethylhexamethylene diisocyanate, 3-3'-dichloro-4,4'-biphenylene diisocyanate, 1,5-naphthalene diisocyanate and 1,5-tetrahydronaphthalene diisocyanate.

9. A water-soluble urethane polymer represented by the following formula:

wherein $R_1$ represents an ester residue from a carboxylic acid and a multivalent alcohol, $R_2$ represents a residue of the diisocyanate compound, and n represents an integer in a range from 1 to 100, and wherein the water-soluble urethane polymer has an acid value of 100 to 250.

10. The polymer according to claim 9, wherein $R_1$ is represented by the following formula:

wherein the residue A is an aromatic, alicyclic or aliphatic polybasic acid residue, and the residue B is a trivalent aliphatic alcohol residue.

* * * * *

UNITED STATES PATENT AND TRADEMARK OFFICE
CERTIFICATE OF CORRECTION

PATENT NO.    : 6,552,156 B2
DATED         : April 22, 2003
INVENTOR(S)   : Hiromichi Noguchi et al.

It is certified that error appears in the above-identified patent and that said Letters Patent is hereby corrected as shown below:

Title page,
Item [30], Foreign Application Priority Data, insert
-- September 12, 1997   (JP) ................. 9-265086 --.

Column 7,
Line 38, "selected-from" should read -- selected from --.
Line 61, "Oranae" should read -- Orange --.

Column 8,
Line 18, "Disierse" should read -- Disperse --.
Line 20, "Dis-erse" should read -- Disperse --.

Column 12,
Line 31, "the." should read -- the --.

Column 14,
Lines 10-11, should be deleted.
Line 41, above the line, insert -- Aqueous lithium hydroxide solution (pH adjustor) as needed --.
Line 43, should be deleted.

Signed and Sealed this

Ninth Day of March, 2004

JON W. DUDAS
*Acting Director of the United States Patent and Trademark Office*